June 7, 1949.    M. N. YARDENY    2,472,271
ANTIHUNTING MEANS FOR CONTROL DEVICES
Filed Feb. 26, 1944    3 Sheets—Sheet 1

MICHEL N. YARDENY
INVENTOR

BY John P. Nikonow
ATTORNEY

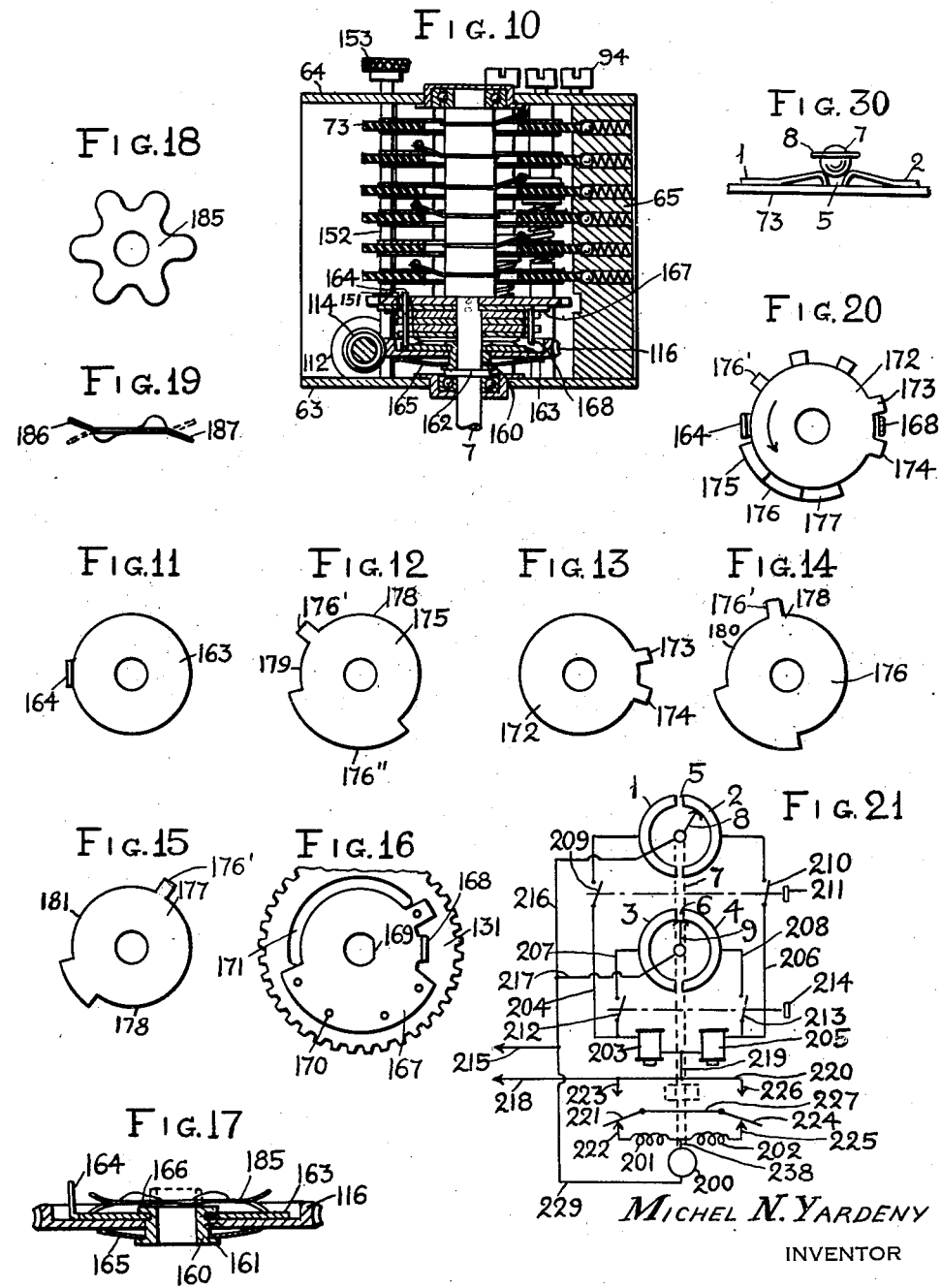

June 7, 1949.   M. N. YARDENY   2,472,271
ANTIHUNTING MEANS FOR CONTROL DEVICES
Filed Feb. 26, 1944   3 Sheets-Sheet 3
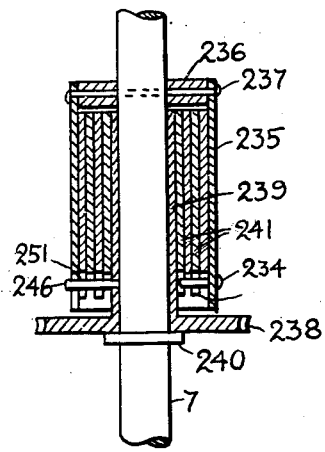
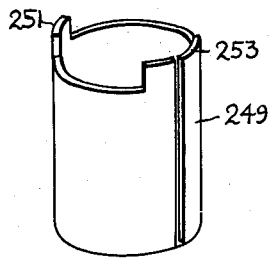
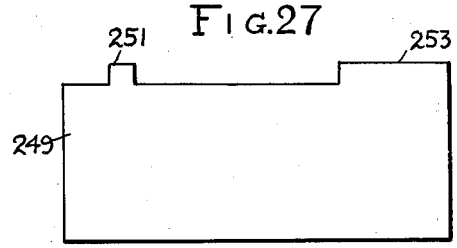
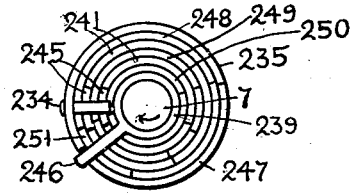
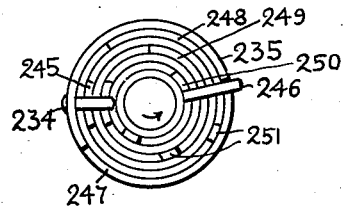
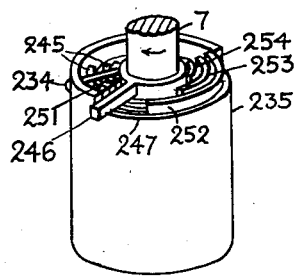
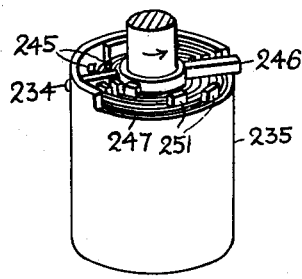
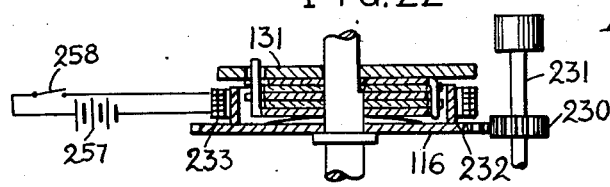
MICHEL N. YARDENY
INVENTOR
BY John P. Nironow
ATTORNEY Patented June 7, 1949

2,472,271

UNITED STATES PATENT OFFICE 2,472,271

ANTIHUNTING MEANS FOR CONTROL DEVICES

Michel N. Yardeny, New York, N. Y.

Application February 26, 1944, Serial No. 524,029

6 Claims. (Cl. 318—33)

My invention relates to improvements in antihunting means to be used in conjunction with control apparatus and systems for placing a load or object in a predetermined or stopping position or in one of several predetermined positions. It relates more particularly to improvements in anti-hunting means for control apparatus comprising a movable control element and reversible drive means for the control element which drive means are rendered inoperative when the control element reaches a predetermined stopping position.

With control apparatus and systems of the type described, difficulties have been encountered to secure an accurate and definite stopping of the control member in its predetermined position. These difficulties are substantially due to oscillations and continued movements of the drive means, preferably a motor, after the drive means have been rendered inoperative. Such oscillations and continued movements of the drive means tend to cause the control element to overrun its stopping position and then to hunt for this position thereby adversely affecting the accuracy and operation of the control apparatus.

A principal object of my invention is to provide novel and improved anti-hunting means for suppressing, eliminating and absorbing oscillations and other continued movements of the drive means after having been rendered inoperative.

Another object of my invention is to provide novel and improved means for reducing the force of inertia affecting the drive means and causing continued movements and oscillations of the drive means after these have been rendered inoperative. I hereby reduce any tendency of the control element to oscillate at its predetermined stopping position or to hunt for such position.

Another object of my invention are novel and improved means for suppressing, eliminating and absorbing oscillations and other continued movements of the drive means after these have been rendered inoperative by including a means between the drive means and the control element which causes the control element to move at lower speed than the drive means upon a reversal of the drive means and to attain the full speed of the drive means only gradually. I hereby accomplish that the control element resumes movement in its new direction at a reduced speed and can be rapidly and conveniently stopped when reaching its stopping position before having attained a high speed.

Another object of my invention is novel and improved means for providing a limited frictional play between the control element and the drive means for absorbing and rendering harmless and ineffective oscillations and continued movements of the drive means after these have been rendered inoperative.

Another object of my invention are novel and improved means for providing a limited play and a progressively increasing friction between the control element and the drive means after these have been rendered inoperative.

Another object of my invention is a control apparatus comprising a movable control element driven by reversible drive means which are rendered inoperative when the control element reaches a predetermined stopping position and a frictional clutch between the control element and the drive means for causing limited play and progressively increasing friction between the control element and the drive means upon a reversal of the drive means.

Another object of my invention are novel and improved anti-hunting means in which means for suppressing, eliminating and absorbing oscillations and other continued movements of the drive means after having been rendered inoperative are combined with and supplemented by means for yieldably retaining the control element in its predetermined or stopping position. I hereby accomplish that a control element reaching its stopping position at low speed due to the effect of the means for suppressing, eliminating and absorbing oscillations and other continued movements of the drive means is retained and rapidly stopped in its predetermined stopping position by the retaining means when the drive means are rendered inoperative and are moving by inertia only.

Other and further objects and advantages of my invention will be hereinafter set forth and the novel features thereof defined by the appended claims.

Referring to the drawings which illustrate several of various embodiments of my invention but to which my invention is by no means restricted since the drawings are merely shown by way of illustration and not by way of limitation:

Figure 1:
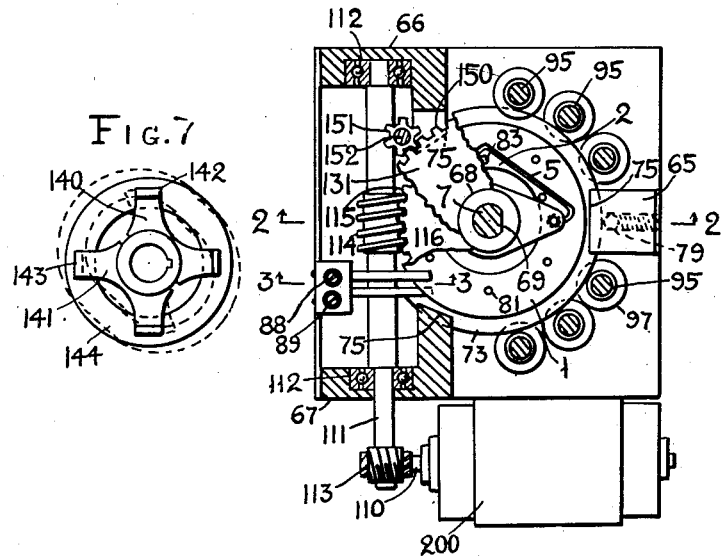
Fig. 1 is a sectional plan view of a control apparatus of the type also known under the trade-mark or trade name "Spot Tuner," including anti-hunting according to my invention.
Figure 2:
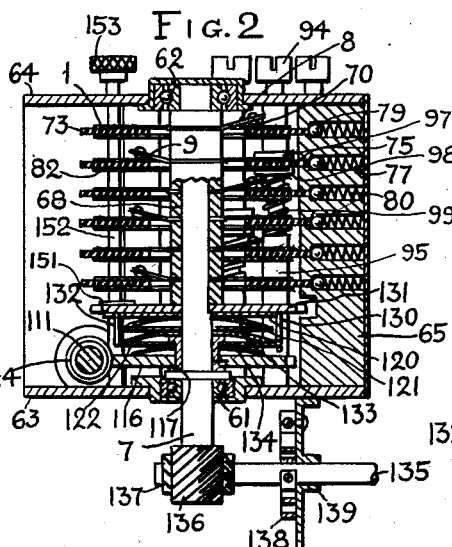
Fig. 2 is a sectional view of Fig. 1 taken along the line 2—2 of Fig. 1.
Figure 6:
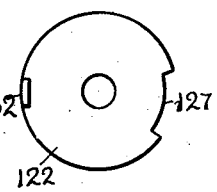
Figure 4:
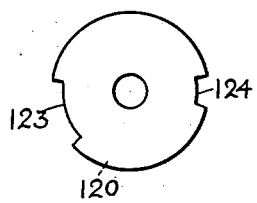
Figure 5:
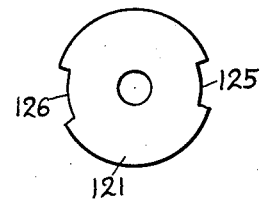

Figs. 4, 5, and 6 are detailed views of parts or elements of the control apparatus shown in Figs. 1 and 2.

Fig. 7 is a detailed view of a modification of a clutch to be used in conjunction with the control apparatus shown in Figs. 1 and 2.

Figure 8:
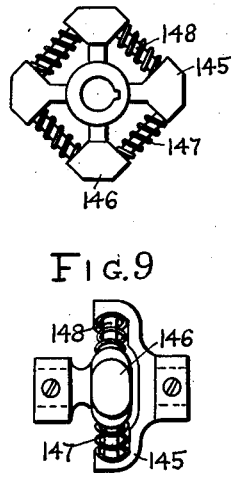
Figure 9:
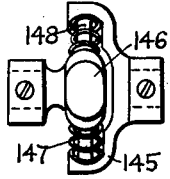
Figure 3:
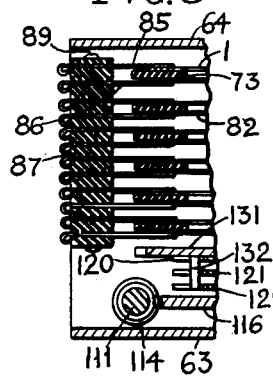
Fig. 3 is a fractional sectional view of Fig. 1 taken along line 3—3 of Fig. 1.

Figs. 8 and 9 are detailed views of another modification of a clutch to be used in conjunction with the apparatus shown in Figs. 1 and 2.

Fig. 10 is a sectional view of another modification of my invention, the apparatus shown in Fig. 10 being distinguished from the apparatus shown in Figs. 1 and 2 by the structure of the clutch used.

Figs. 11 to 16 are detailed views of friction discs used in a clutch according to Fig. 10.

Fig. 17 is a detailed view of the driving member of the clutch according to Fig. 10.

Figs. 18 and 19 are a detailed plan and sectional view respectively of another element of the clutch according to Fig. 10.

Fig. 20 is a plan view of an assembly of discs used for the clutch shown in Fig. 10.

Fig. 21 is a circuit diagram of an electric control apparatus according to my invention, the diagram showing several circuits for placing a useful load in one of several predetermined positions, the driving means being shown as a series wound motor.

Fig. 22 shows a modification of the friction clutch shown in Figs. 1 and 2 or 10.

Fig. 23 shows a sectional view of another modification of a friction clutch according to my invention.

Fig. 24 is a plan view of Fig. 23 showing the various friction elements of the clutch in a certain relative position.

Fig. 25 is a perspective view of the clutch showing the various friction elements of the clutch in substantially the same relative position as Fig. 24.

Fig. 26 shows a perspective view of one of the friction elements of the clutch.

Fig. 27 shows a development of a friction element.

Fig. 28 is a plan view similar to Fig. 27 but showing the friction elements in different relative positions.

Fig. 29 is a perspective view of the clutch corresponding to Fig. 28 and similar to Fig. 25 with the exception that direction of rotation is reversed, and Fig. 30 is a sectional view of the gap between two conducting segments on an enlarged scale.

The device shown in Figs. 1 to 6 comprises a shaft 7 mounted in bearings 61 and 62 supported by end plates 63 and 64. These end plates together with posts or standards 65, 66, 67 form a housing or frame for the control apparatus. Shaft 7 carries contact members or contactors 8, 9 . . . These contactors are preferably made of resilient conducting material and mounted on shaft 7 either directly or by means of sleeves 68. They are axially slidable but secured against rotation by means of a flattened section 69 of shaft 7 or any other suitable means. Each contactor may have a substantially triangular shape and carries a contact ball 70 preferably made of chromium, tungsten, or other hard metal. Instead of balls similar bodies of revolution such as cylinders may be used. The contact member is shaped and arranged to bridge a gap separating two conducting members or segments preferably by a two point contact. The gap itself may be shaped and elevated as, for example, shown in Fig. 30 and more fully described in my Patent 2,342,717 and copending applications, Serial No. 477,469, filed February 27, 1943, and Serial No. 490,767, filed June 14, 1943, now abandoned. The elevation of the gap may also be one sided as shown in my copending application Serial No. 522,062 filed February 12, 1944.

The conducting members or segments designated by numerals 1, 2 may have a semi-circular shape or preferably the shape illustrated in Fig. 1. This figure shows an annular segment 1 having a substantially triangular recess in which the substantially triangularly shaped segment 2 is placed. Both segments are separated by a neutral point or line such as gap 5. Each pair of segments is supported on an annular disc or ring 73 made of a suitable insulating material such as known under the trade-mark "Bakelite." The insulated discs are rotatably supported in corresponding slots or grooves 75 provided in posts 65, 66, 67. In order to secure discs 73 in their positions in the slots or grooves, borings or holes 77 in alignment with grooves 75 are provided in post 65 in which holes plungers or balls 79 are inserted. These balls are pressed by springs 80 or other suitable means against the edges of discs 73, thereby pressing the discs against the bottoms of the grooves or slots 75 in posts 66 and 67 as shown in Fig. 1.

The outer segments 1 are secured to the upper side of the annular discs 73 by rivets 81, screws or similar means. The bottom side of each annular disc carries a ring 82 or similarly shaped element of conducting material which is fastened to its disc by means of rivets, bolts, or screws 83. The rivets may also serve to connect the inner segment 2 electrically to ring 82. It is of course also possible to provide separate rivets or bolts for this purpose. The segments are connected to the electric circuits of the apparatus by suitable means such as a pair of tongues 85 and 86 respectively for each annular disc. Fingers 85 engage segment 1 and fingers 86 rings 82. Fingers 85, 86 are separated by insulators 87 and fastened to the housing of the control apparatus by any suitable means. Screws 88, 89 may be provided to hold the fingers and the insulators together. In the embodiment illustrated in the drawings the conducting segments are placed on the top side of the discs and the rings are fastened to the lower side. The reverse arrangement is of course also possible.

As will be explained more fully hereinafter and in connection with the description of the circuit diagram shown in Fig. 21, shaft 7 is driven by suitable reversible driving means such as a reversible motor 200 which will be operative in one or the other direction when a contactor engages one of the conducting segments and will be rendered inoperative or stopped when a contactor reaches or bridges a gap. The relative positions of the annular discs and hence of the gaps can be adjusted by any suitable means, for example, by rotating the discs individually. Figs. 1 and 2 show such means to adjust the positions of the gaps for one of the discs 73 in detail. A shaft 95 is rotatably supported between end plates 63 and 64 and can be rotated by means of screws 94 shown in Fig. 2. The shaft carries friction means, for example, an upper friction washer 97 and a lower friction washer 98 which washers engage the edge of the corresponding disc 73. Hence a rotation of shaft 95 will cause a rotation of the engaged disc and with it of the gap separating the conducting members fastened to the disc. In order to secure a transport of the disc, the engaging surfaces of the friction washers may be slightly knurled. I found it advantageous to fit one of the friction washers, for example, the upper washer, rigidly on the shaft and the lower washer slidably and to provide spring means such as a helical spring 99 pressing washer 98 against the disc. The tension of this spring is chosen so that a disc can be accurately adjusted by rotating shaft 95. Resilient brakes may be provided which engage the lower portion of shaft 95 frictionally to prevent an unintentional rotation of the shaft causing a displacement of the disc and of the gap due to the pressure of the contactor engaging the conducting members carried by the disc.

It is of great importance to prevent oscillations or hunting of the drive means after these have been rendered inoperative in response to a contactor reaching or bridging a gap. I have found that due to inertia the motor will not stop abruptly after having been rendered inoperative but will continue to move in its original direction, thus forcing the contactor out of the gap. Assuming, for example, that the contactor has moved over segment 1 and engaged gap 5, thus bridging segments 1 and 2 in which position the motor is rendered inoperative. As a result of the limited continued movement of the motor due to inertia, the contactor will be forced out of the gap and will now engage segment 2 only. Consequently, the motor will be restarted immediately in reversed direction as previously explained and more fully explained hereinafter and move the contactor toward the gap. Due to the momentum of the motor, the contactor will again overrun the gap whereupon the motor is again restarted in reversed direction. This cycle may repeat itself many times, in other words, contactor and motor will oscillate near the gap and hunt for the gap. Such hunting and oscillations tend to affect the operation and accuracy of the control apparatus as explained more fully in my Patent No. 2,342,717. According to my invention, I avoid such hunting and oscillations by providing anti-hunting means for suppressing, eliminating and absorbing oscillations and other continued movements of the drive means after these have been rendered inoperative.

According to my invention this result can be accomplished by reducing the force of inertia affecting the drive means and causing continued movements and oscillations of the drive means after these have been rendered inoperative, for example, by providing means causing the control element to resume its movement at a comparatively low speed after a reversal of the drive means even though the driven means resume their movement at a higher speed. As a result the inertia of the control element when reaching its stopping position will be rather low and the control element can be rapidly and conveniently stopped. According to a preferred embodiment of my invention I provide a certain limited amount of frictional play in the operative connection between the shaft 7 and the driving motor. This frictional play will prevent the motor to gather sufficient momentum and speed when reversed near the gap so that the contactor reapproaches the gap at a slow speed. Consequently, the motor will rapidly come to a standstill leaving the contactor in its gap bridging position. The effect of the frictional play can be enhanced or supplemented by providing frictional resistance in the gap itself, for example, by raising the edges of the gap as previously mentioned. Such raised gap will yieldably retain a contactor reaching the gap with sufficient torque to overcome the frictional resistance of the operative connection while the latter absorbs the remaining inertia of the motor.

A suitable arrangement for this purpose is shown in Figs. 1, 2, 4, 5 and 6 in detail.

The shaft 110 of the motor 200 is coupled to a rotatable shaft 111 mounted in bearings 112 by gears 113, or any other suitable means. Shaft 111 carries a worm 114 engaging a worm gear 115 on the periphery of a disc 116. However, any other suitable drive between motor 200 and disc 116 can be provided. Disc 116 is rotatably mounted on a bushing or sleeve 117 rotatable on shaft 7 and cooperates with friction discs 120, 121 and 122. Discs 120, 121 and 122 are mounted on shaft 7, disc 121 being rotatably mounted thereon and disc 122 being rotatably mounted on a bushing which, in turn, is rotatably mounted on the shaft. Disc 120 is provided with elongated recesses or slots 123, 124, disc 121 with elongated recesses or slots 126, 125 and disc 122 with an elongated slot or recess 127. Recesses 124, 125 and 127 are engaged by a pin 130 extending from a disc 131 keyed to shaft 7. Recesses 123 and 126 are engaged by a second pin 132 extending from disc 122. In order to increase the frictional resistance between the discs, springs 133 may be provided between some or all of the friction discs. Differently strong springs may be used to obtain varying friction between successive discs. It is also possible to use a single spring to compress the friction discs that are slidable on shaft 7. Disc 122 and motor driven disc 116 are frictionally coupled by a spring 134 or by friction between the discs themselves. Instead of three friction discs as shown in the drawing, any other suitable number of discs can of course be used. The friction coupling operates as follows:

When motor 200 rotates disc 116 in one direction, all frictional discs of the drive will be shifted to one side, the drive being effected by pins 130, 132 engaging the corresponding edges of all the discs at the slots or recesses and transmitting drive through the shaft 7, through the gear 131. Upon reversal of the rotation of the motor, however, the pins move away from the engaged edges, the rotation being then transmitted by the friction between the discs. Due to the progressively increasing length of the recesses, the friction discs are successively connected for direct drive. After the first disc slides into a position in which the driving pin engages the edge of its recess, the second disc will be also engaged and will slide together with the first disc until the third disc is engaged, and so on, depending upon the number of frictional discs. The amount of frictional work between the discs and the springs will absorb oscillations of the motor completely or at least substantially before reaching shaft 7. Furthermore, the clutch will not immediately transmit the full speed of the motor to shaft 7 and hence to the contactors due to the slippage between the frictional elements of the clutch when the motor resumes its rotation after a reversal. Consequently, shaft 7 will begin to rotate at a substantially lower speed than the motor and the contactors will approach the gap with correspondingly reduced inertia and the motor will be again rendered inoperative. Due to the low speed of the contactor, its tendency to overrun the gap will be very slight and the contactor will be retained in the gap by the effect of the elevated edges of the gap and will be brought rapidly to a final stop.

A modified frictional clutch or coupling using internal friction is shown in Fig. 7. This coupling comprises two halves, 140, 141 provided with lugs or projections 142, 143 passing through corresponding holes in a flexible ring 144 made of an imperfectly elastic material such as a rubber composition. This ring will be elastically deformed by torsional forces as shown in dotted lines in Fig. 7. The internal friction of this deformation will absorb oscillations of the motor at least to a substantial extent.

Another type of a frictional clutch or coupling using internal friction is shown in Figs. 8 and 9. This coupling comprises two halves 145, 146 arranged at right angles to each other and connected by springs 147. In order to damp the spring oscillations, imperfectly elastic rods 148 may be provided.

Shaft 7 may be coupled to a shaft 135 of a useful load such as tuning condenser by gears such as 136, 137. In order to maintain the accuracy of the movements transmitted from shaft 7 to shaft 135, a clock spring 138 may be placed between shaft 135 and a bearing 139 for this shaft. This spring is held under constant tension thus maintaining the gearing teeth in constant contact in the same direction, thereby eliminating any play in the gearing. Gears 136, 137 may also be used to increase the resistance of the contactor movements in one direction thereby causing a tendency of the shaft to overrun in one direction and to stop on its return movement, thus increasing the accuracy of the device.

Means may also be provided for a manual rotation of shaft 7. According to the embodiment illustrated in Figs. 1 and 2, the periphery of disc 131 is provided with teeth 150. These teeth are engaged by a pinion 151 keyed to a shaft 152 supported by end plates 63 and 64. A thumbhead 153 may be provided at the end of shaft 152 to facilitate rotation of shaft 152. Instead of a gear drive as shown in Figs. 1 and 2, another suitable drive such as a friction drive can be employed. The worm gear drive 114, 116 being irreversible, the clutch assembly will slide over the spring 134 when the manual gears are rotated, leaving the motor stationary. The spring 134 connecting the worm gear 116 with the clutch made for this purpose is substantially stronger than the springs 133 so that there is normally no slippage in the worm gear.

Figs. 10 to 20 show another and preferred modification of a coupling or clutch permitting a limited progressive frictional play between shaft 7 and the motor driving this shaft.

The clutch is illustrated in conjunction with a control apparatus similar to the one shown in Figs. 1 and 2. It comprises a bushing or sleeve 160 loosely mounted on shaft 7 and abutting with its lower flange 161 against a collar 162 of shaft 7. The bushing carries the gear wheel 116 engaged by worm 114 and a friction disc 163 from which extends a pin 164. Gear wheel 116 and disc 163 are pressed by a spring 165 against the upper flange 166 of bushing 160 thereby forming a self-contained unit and a frictional coupling between gear wheel 116 and disc 163 and also between these two elements and the bushing. Gear wheel 116 and disc 163 form the driving element of the frictional clutch. The driven element of this clutch comprises a disc 167 from which extends a pin 168. This disc is keyed to shaft 7 by means of a flattened surface 169 or other suitable means and fastened by rivets 170 or similar means to gear wheel 131 engaged by pinion 151. Gear wheel 131 may be provided with a curved guiding slot 171 extending over approximately 180 degrees and engaged by pin 164. The driving element and the driven element of the clutch are frictionally coupled by a plurality of discs engaged by pins 164 and 168. These discs form two sets. The discs of one set hereinafter referred to as "stationary discs" are all similar. One of these discs is shown in Fig. 13. Each stationary disc 172 has two noses or lugs 173 and 174 spaced sufficiently to form a recess to be engaged by one of the pins 164, 168, for example, by pin 168. The discs of the other set hereinafter referred to as "movable discs" have different shapes. Each of the movable discs, three of which are shown in Figs. 12, 14 and 15 and designated by numerals 175, 176 and 177, has two elongated recesses. One of the elongated recesses designated by numeral 178 has the same length for all movable discs and extends preferably over approximately 180°. The length of the second recess is different for each movable disc. The recesses are separated by narrow lugs 176'. Disc 175 has a second recess 179, disc 176, a second recess 180 and disc 177 and a second recess 181. It will be noted that the recesses 179, 180 and 181 are of gradually extending lengths. Stationary and movable discs are assembled so that pin 168 engages the recesses between noses 173 and 174 of all stationary discs and also the recesses 178 of all movable discs and that pin 164 engages recesses 179, 180, 181 of the movable discs and passes all stationary discs outside the recesses formed by noses 173, 174. One stationary disc is always sandwiched between two movable discs.

Fig. 20 shows a plan view of an assembly composed of a stationary disc 172, movable disc 175, a second stationary disc 172, movable disc 176, a third stationary disc 172 and movable disc 177. As will be noted from Fig. 20, pin 168 is holding all stationary discs in a fixed relative position but permits movements of the movable discs within a range of 180° corresponding to the length of recesses 178. The possible relative movements of the movable discs are determined by the lengths of their recesses 178, 180 and 181 engaged by pin 168.

It will be understood from the previous description that any suitable number of stationary and movable discs may be used and that each pin may control either the stationary or the movable discs.

An assembly of discs such as shown in Fig. 20 is inserted between the driving and the driven element of the clutch and compressed by a spring 185 preferably placed between disc 163 and the bottom disc 177 of the assembly of discs. Spring 185 may have upward and downward bent prongs 186 and 187 pressing against discs 163 and 177 respectively at its periphery, thereby obtaining a greater frictional torque. (Figs. 18 and 19).

I have found it advantageous to arrange the spring so that the pressure exerted by it is directed substantially against the outer parts of discs 163 and 177.

The operation of the clutch is as follows:

When gear wheel 116 is rotated by worm 114, disc 163 will rotate together with gear wheel 116. Gear wheel 116 and disc 163 may be considered as rigidly coupled in this connection, the friction between these discs being so great that they will not move relatively to each other unless the contactors 8, 9 ... are manually moved as previously described.

Assuming now that gear wheel 116 is rotated in the direction indicated by an arrow shown in Fig. 20 and that all movable discs are in a position in which all the left edges (as viewed in Figs. 12, 14 and 15) of projection 176'' are engaged by the pin 164, which also engages disc 131 at the end of slot 171. All the intermediate discs 172 are engaged by the pin 168 extending from the disc 167 and, consequently, rigidly connected to the shaft 7. The other lugs 176' are spread out as shown in Fig. 20. The clutch is then rigidly connected for transmitting to full driving torque. When the motor rotation is reversed, however, the pin 164 will leave the end of the slot 171 and will move until the other end of the slot is reached and the solid driving connection is reestablished. While pin 164 is moving in the slot, torque is transmitted through the frictional plates as follows (Fig. 20): Pin 164, after leaving the left edges of projections 176'', will reach the first lug 176', causing the corresponding disc 175 to rotate until the next lug 176' is reached, when the next disc 176 will also turn; and, finally, the third lug 176' will be engaged, and all three discs will be rotated until the pin 164 reaches the end of the slot 171, as was mentioned above.

With the reversal of the rotation the pin 164 will at first move the disc 175 until disc 176 is reached, and so on, moving progressively increasing the number of discs. The discs, moving relatively of the adjacent stationary discs 172, will develop certain frictional work, absorbing part of the oscillations and movements of the motor after the motor has been rendered inoperative.

As it is apparent from the previous specification, the friction discs of the clutch are made successively effective, thus progressively increasing the total frictional work to be overcome by the oscillations and movements of the motor due to inertia. Furthermore, the clutch will not immediately transmit the full speed of the motor to shaft 7 and hence to the contactors due to the slippage between the frictional elements of the clutch when the motor resumes its rotation after a reversal. Consequently, shaft 7 will begin to rotate at a substantially lower speed than the motor and the contactors will approach the gap with correspondingly reduced inertia and the motor will be again rendered inoperative. Due to the low speed of the contactor, its tendency to overrun the gap will be very slight and the contactor will be retained in the gap by the effect of the elevated edges of the gap and will be brought rapidly to a final stop. I have found that the use of a frictional clutch as previously described will result in a rapid and effective stopping of the motor movements and oscillations after the motor has been rendered inoperative.

The circuit diagram shown in Fig. 21 can be advantageously used in connection with and for the operation of a control apparatus according to my invention. However, it should be understood that a control apparatus according to the invention can be used and operated in connection with any other suitable circuit system.

The circuit diagram shown in Fig. 21 comprises one or more pairs of conducting members 1, 2, 3, 4, etc. each pair being separated by a neutral point 5, 6 such as a gap. The driving shaft 7 of the apparatus is rotatably supported on the common axis of the segments and mounts contactors or contact members 8, 9 slidably engaging the segments as explained more fully in connection with the previous figures. The contact point or element at the end of each contactor is sufficiently large to bridge an engaged gap thus electrically connecting the conducting members separated by the gap. Shaft 7 can be revolved by any suitable reversible driving means. In the circuit system shown in Fig. 21, the armature of reversible electric motor 200 is operatively connected to shaft 7. Fig. 21 illustrates a series wound motor having series field windings 201, 202. However, it should be understood that any other suitable type of motor such as a shunt wound or induction motor can be employed.

Segment 1 is connected to a relay coil 203 through a lead 204 and segment 2 to a second relay coil 205 through a lead 206. Segment 3 is connected to coil 203 through a lead 207 and segment 4 to coil 205 through a lead 208. Leads 204, 206 include switches 209, 210 respectively, simultaneously controlled by a common handle 211. Leads 207, 208 include switches 212, 213 respectively, simultaneously controlled by a common handle 214. Contactor 8 is connected to one terminal 215 of a source of current through a lead 216 and contactor 9 is connected to terminal 215 through a lead 217 and lead 216. Coils 203 and 205 are connected to the second terminal 218 through a common lead 219 and a lead 220. Coil 203 controls a pivotal arm 221 engaging a contact point 222 in its released position and a contact point 223 in its attracted position. Coil 205 controls a pivotal arm 224 engaging a contact point 225 in its released position and a contact point 226 in its attracted position. Arms 221 and 224 are connected by a lead 227. Contact points 223 and 226 are connected to lead 220 and contact points 222 and 225 to one of the ends of field windings 201, 202 respectively. The other ends of these field windings are connected to one end of the armature of motor 200 through a common lead 228. The other end of the armature is connected to terminal 215 through a lead 229. Assuming now that switches 209 and 210 are closed and that contactor 8 engages segment 2, then a circuit for relay coil 205 is closed from terminal 215 through lead 216, contactor 8, segment 2, switch 210, lead 206, relay coil 205, lead 219 and lead 220 to terminal 218. Coil 205 will attract its arm 224 which will engage contact point 226, thus closing a circuit for the motor from terminal 218 through lead 220, point 226, arm 224, lead 227, arm 221, point 222, field winding 201, armature of motor 200 and lead 229 to terminal 215. The motor will rotate in a definite direction and move contactor 8 toward gap 5. When contactor 8 engages segment 1, similar circuits for relay coil 203, the motor and field winding 202 are closed causing a rotation of the motor in the reversed direction.

As soon as contactor 8 engages and bridges gap 5, both relays are energized and attract their arms thus disconnecting the motor and its field windings from the source of current. If the relays are arranged to be both deenergized upon a contactor bridging a gap, the field windings are short circuited through lead 227.

It will be noted from the drawings that the motor will be restarted in reversed direction if the contactor overruns the gap due to inertia of the motor and again rendered inoperative when the gap is bridged again by the contactor. The oscillations and movements of the motor caused hereby will be absorbed and suppressed by the previously described anti-hunting means.

The modification shown in Fig. 22 discloses means for coupling the driving element and the driven element of the clutch sufficiently rigidly to prevent a rotation of the driven element in either direction with or without substantial frictional play. Such an arrangement is advantageous under certain circumstances, i. e. when gear wheel 116 normally driven by the motor is to be rotated by a worm 230 manualy driven by a shaft 231 having a thumbhead.

This purpose can be accomplished by providing electromagnetic means which if energized urge axially slidable gear wheel 131 toward gear wheel 116, thus compressing the friction discs of the clutch and prohibiting a frictional play or slippage upon reversal.

These electromagnetic means comprise an annular core 232 fastened to gear wheel 116 and coil 233, which may be stationary and may be connected to a source of current 257 and a control switch 258.

The modified clutch shown in Figs. 23 to 29 comprises an outer shell 235 attached to the drive shaft 7, for example, by a bushing 236 and a pin 237. Rotation of the motor is transmitted by a worm gear 238 rigidly fastened to a sleeve 239 freely rotating on the shaft 7 and retained in its axial position by a collar 240. A pin 234 extends from the shell 235 toward the sleeve 239. The pin engages slots formed between lugs 245 on concentric frictional sleeves 241 positioned between the sleeve 239 and the outer shell 235. The sleeves are split lengthwise (see Fig. 26) and may be slightly deformed from the true cylindrical shape to increase their resilient frictional engagement with the other sleeves. A pin or finger 246 extends from the inner sleeve 239 beyond the outer shell 235 and engages a recess 247 which limits the possible relative motion between the outer shell 235 keyed to shaft 7 and the inner sleeve 239 fastened to gear 238.

Additional frictional sleeves 248, 249, 250 having slots of varying width between lugs 251, 252, 253 and 254 are placed between the sleeves 241. The lugs 251 are relatively narrow while the lugs 252, 253, 254 are relatively wide and are of different width for different sleeves. The distance between the lugs at one side is the same for all sleeves and approximately equals the length of the slot or recess 247, while the distance between the lugs at the other side progressively varies for different sleeves.

During the rotation of the motor, the pin 246 engages one or the other shoulder at the end of the recess 247, depending on the direction of rotation. Fig. 25 shows the position of the pin 246 for clockwise rotation of the shaft 7. The pin 246 gathers in front of it all narrow lugs 251, the long lugs being distributed in the space limited by the recess 247 as shown in Fig. 25.

Upon reversal of the motor rotation, the pin 246 leaves the shoulder of the recess 247, moving in a counterclockwise direction. It engages at first the longest lug 252, causing the sleeve 248 to rotate between the adjacent sleeves 241 and also moving forward the corresponding lug 251. Upon completion of the first movement, the pin 246 engages also the next lug 253 of the sleeve 249, causing the latter to rotate with the sleeve 248 and moving the corresponding short lug 251 also forward. The third sleeve 250 is picked up in the same manner, the force of friction progressively increasing until the pin 246 abuts the other shoulder in the recess 247 as shown in Fig. 29. All the long lugs will be then gathered in front of the pin 246 and the short lugs will be spaced in the recess 247.

With the next reversal of rotation, the pin 246 will successively pick up the short lugs, causing the corresponding sleeves to rotate until the position of Fig. 25 is reached again.

The operation and effect of the clutch shown in Figs. 23 to 29 is substantially similar to the one described in connection with Figs. 1, 2 and 10.

I have found that in order to obtain substantially the same friction between the friction elements at all times it is desirable to place a suitable lubricant between the frictional surfaces. The lubricant reduces friction to a certain extent, requiring a somewhat greater spring tension, but it helps to maintain the surfaces smooth, preventing their abrasion or scoring.

For operation at low temperatures such as, for instance, use with radio control devices on airplanes, I prefer to employ a commercial grease especially made for low temperatures, such as Beacon M 285 which, according to my experience operates satisfactorily in my clutch at temperatures as low as −55° C.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A frictional clutch interposed between a reversible driving member and a driven member, comprising, in combination, a rotatably mounted clutch element driven by the said driving member, a second clutch element secured to rotate with the said driven member and provided with an arcuate slot and a stud, said clutch element of the driving member being provided with a stud slidably received in the said arcuate slot of the clutch element of the driven member, a plurality of rotatably mounted discs interposed between the said two clutch elements and connected to the said stud of the clutch element of the driven member, a second plurality of rotatably mounted discs likewise disposed between the said two clutch elements and alternately spaced relative to the first said plurality of discs, each of the discs of the said second plurality having a pair of spaced projections adapted to receive the said stud of the clutch element of the driving member between their facing edges, the arcuate distance between the said projections being different in individual ones of the plurality of discs and less than the length of the said arcuate slot whereby the said driving member positively drives the driven member by abutment of its said stud with the anterior end of the said arcuate slot, the anterior projections of the second said pluralities of discs being aligned through entrainment by the last-mentioned stud to cause the posterior projections to be staggered at different distances from the said aligned anterior projections, and spring means to apply friction between the two said pluralities of alternately spaced discs whereby upon reversal of direction of the said driving member, its said stud will progressively abut the said staggered projections to frictionally drive the said driven member with correspondingly increased torque, the said stud thereafter positively driving by abutment with the other end of the said arcuate slot.

2. A frictional clutch interposed between a reversible driving member and a driven member, comprising, in combination, a rotatably mounted clutch element driven by the said driving member, a clutch element secured to rotate with the said driven member and provided with a pair of spaced stops, said clutch element of the driving member being provided with a stud abuttable with the said pair of spaced stops of the clutch element of the driven member, a plurality of discs interposed between the said two clutch elements secured to rotate with the driven member, a second plurality of rotatably mounted discs likewise disposed between the said two clutch elements and alternately spaced relative to the first said plurality of discs, each of the discs of the said second plurality having a pair of spaced projections adapted to abut the said stud, the arcuate distance between the said projections being different in individual ones of the plurality of discs and less than the space between the said pair of stops whereby the said driving member positively drives the driven member through abutment of its said stud with the anterior one of the said pair of stops, the anterior projections of the second said pluralities of discs being aligned through entrainment by the said stud to cause the posterior projections to be staggered at different distances from the said stud, and spring means to apply friction between the two said pluralities of alternately spaced discs whereby upon reversal of direction of the said driving member, its said stud will progressively abut the said staggered projections to frictionally drive the said driven member with corresponding increased torque, the said stud thereafter positively driving by abutment with the other stop.

3. A frictional clutch interposed between a reversible driving member and a driven member, comprising, in combination, a stud secured to the said driving member, the said driven member having an arcuate slot to receive the said stud and being provided with a second stud, a plurality of rotatably mounted discs interposed between the said two members and connected to the said stud of the driven member, a second plurality of rotatably mounted discs likewise disposed between the said two members and alternately spaced relative to the first said plurality of discs, each of the discs of the said second plurality having a pair of spaced projections adapted to receive the said stud of the driving member between their facing edges, the arcuate distance between the said facing edges of the projections being different in individual ones of the plurality of discs and less than the length of the said arcuate slot whereby the said driving member positively drives the driven member by abutment of its said stud with the anterior end of the said arcuate slot, the anterior projections of the second said pluralities of disc being aligned through entrainment by said stud to cause the posterior projections to be staggered at different distances from the said stud, and spring means to apply friction between the two said pluralities of alternately spaced discs whereby upon reversal of direction of the said driving member, its said stud will progressively abut the said staggered projections to frictionally drive the said driven member with correspondingly increased torque, the said stud thereafter positively driving by abutment with the other end of the said arcuate slot.

4. A frictional clutch interposed between a reversible driving member and a driven member, comprising, in combination, a pair of spaced stops secured to one of the said members, a stud provided on the other member and abuttable with the said pair of spaced stops, a plurality of discs interposed between the said members and secured to rotate with one thereof, a second plurality of rotatably mounted discs likewise disposed between the said two members and alternately spaced relative to the first said plurality of discs, each of the discs of the said second plurality having a pair of spaced projections adapted to abut the said stud, the arcuate distance between the said projections being different in individual ones of the plurality of discs and less than the space between the said pair of stops whereby the said driving member positively drives the driven member through abutment of the said stud with the anterior one of the said pair of stops, the anterior projections of the second said pluralities of discs being aligned by the said abutment between the said stud and the anterior stop to cause the posterior projections to be disposed at different distances from the said stud, whereby upon reversal of direction of the said driving member, the said abutment between the said staggered projections of the said stud frictionally drives the driven member with correspondingly increased torque and the subsequent abutment between the said stud and the anterior stop positively drives the driven member.

5. In apparatus for moving a load to desired positions, in combination, a pair of relatively movable members, one of the members having a pair of conducting elements separated by a gap, and the other member having a contact arm engageable therewith, a reversible motor for moving the load, one of the members being selectively pre-set to cause displacement between the said contact arm and gap and engagement with one of the conducting elements to rotate the motor in the desired direction, one member of the said pair being operatively connected to the said load motor, a frictional clutch interposed between the said movable member and the said motor, said frictional clutch comprising a pair of spaced stops secured to rotate with the said movable member, a plurality of elements each provided with a pair of spaced stops, the distance between the stops increasing with successive ones of the said elements, and a stud rotatable by the said motor and receivable in the spaces of the said stops of the plurality of elements and in the space between the said pair of stops of the said movable member, the said elements being in frictional engagement with each other and with the said movable member, the said load motor positively driving the said movable member by abutment of the said stud with the anterior one of the said pair of stops of the movable member, the anterior stops of the said plurality of elements being aligned by the said abutment between the said stud and said anterior stop to cause the posterior stops to be staggered at different distances from the said stud, said movable member being moved in a direction to restore alignment between the said gap and contact arm, the said movable member overrunning the gap to engage with the anterior conducting element to cause reversal of motor rotation to return the movable member toward the gap, detent means to hold the said member at the gap, said movable member being returned by frictional drive and with progressively increased torque as the said stud sequentially abuts the said staggered stops, said motor continuing its movement by inertia after the said restored alignment of gap and with the contact arm held at the gap.

6. In apparatus for moving a load to desired positions, in combination, a pair of relatively movable members, one of the members having a pair of conducting elements separated by a gap, and the other member having a contact arm engageable therewith, a reversible motor for moving the load, one of the members being selectively pre-set to cause displacement between the said contact arm and gap and engagement of contact arm with one of the conducting elements to rotate the motor in the desired direction, one member of the said pair being operatively connected to the said load motor for rotation in a direction to restore alignment between said gap and contact arm, the said movable member overrunning the gap to engage with the anterior conducting element to cause reversal of motor rotation, a frictional clutch interposed between the said movable member and the said motor, said clutch comprising a driving element coupled with said motor, positive coupling means on said driving element, and a plurality of relatively movable driven elements including one driven element coupled with said movable member, said driven elements being in frictional engagement with one another, at least some of said driven elements being provided with formations cooperating with said positive coupling means for successive entrainment thereby, with said one element last entrainable so as to return the said movable member towards the gap in stepped increments of torque, and detent means to hold the said returned movable member at the gap, motor rotation continuing by inertia after the said restored alignment of gap and contact arm de-energizes the motor with the said movable member held at the gap.

MICHEL N. YARDENY.

REFERENCES CITED

The following references are of record in the file of this patent:

UNITED STATES PATENTS

| Number | Name | Date |
|---|---|---|
| 950,290 | Hughes | Feb. 22, 1910 |
| 1,181,053 | Anderson | Apr. 25, 1916 |
| 1,282,786 | Entz | Oct. 29, 1918 |
| 1,425,025 | Schafly | Aug. 8, 1922 |
| 1,425,305 | White | Aug. 8, 1922 |
| 1,550,779 | Carpenter | Aug. 25, 1925 |
| 1,557,525 | Hanson | Oct. 13, 1925 |
| 2,094,777 | Ellinger | Oct. 5, 1937 |
| 2,333,980 | Branson | Nov. 9, 1943 |
| 2,342,717 | Yardeny | Feb. 29, 1944 |
| 2,360,157 | Olson | Oct. 10, 1944 |

FOREIGN PATENTS

| Number | Country | Date |
|---|---|---|
| 501,273 | Great Britain | Feb. 23, 1939 |